(No Model.)
C. G. ORTMAYER.
HORSE COLLAR FASTENER.
No. 431,394. Patented July 1, 1890.
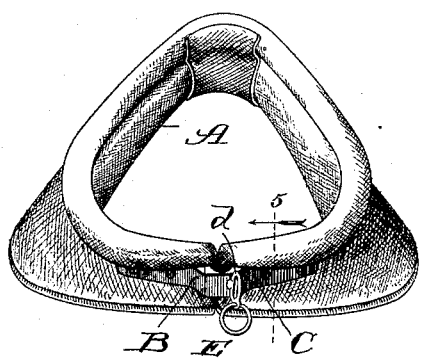
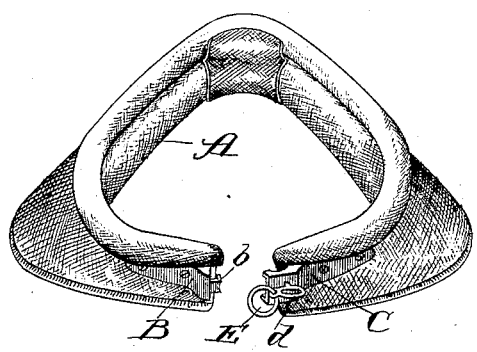
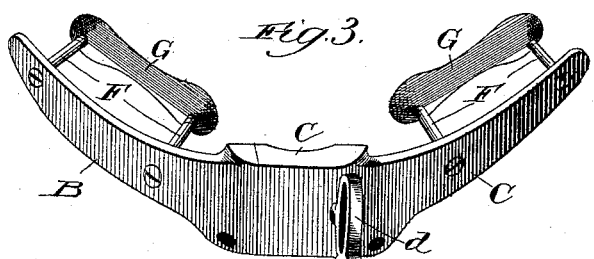
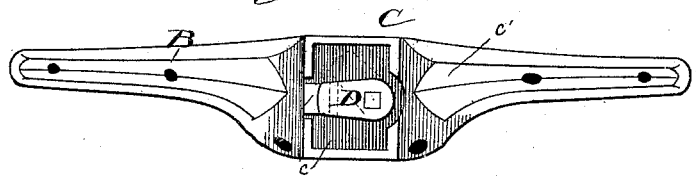
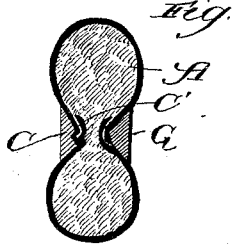
Witnesses:
Inventor:
Carl G. Ortmayer,

UNITED STATES PATENT OFFICE.

CARL G. ORTMAYER, OF CHICAGO, ILLINOIS.

HORSE-COLLAR FASTENER.

SPECIFICATION forming part of Letters Patent No. 431,394, dated July 1, 1890.

Application filed March 11, 1890. Serial No. 343,468. (No model.)

*To all whom it may concern:*

Be it known that I, CARL G. ORTMAYER, a citizen of the United States, residing at Chicago, Illinois, have invented a new and useful Improvement in Horse-Collar Fasteners, of which the following is a specification.

My invention relates to what are known as "separable" horse-collars, or collars which are made in two parts, fastened together at the top and adapted to open at the bottom, in order to allow the collar to be put on without turning it upside down; and the object of my invention is to provide a simple and effective fastener for the bottom of the collar; and my invention consists in the features and details of construction hereinafter described and claimed.

In the drawings, Figures 1 and 2 are perspective views of a collar provided with my improved fastener, the collar being shown closed in Fig. 1 and open in Fig. 2; Fig. 3, a perspective view of the fastener removed from the collar; Fig. 4, a rear elevation of such fastener, the screws and nuts for fastening it to the collar shown in Fig. 3 being removed; and Fig. 5, a cross-section taken on line 5 of Fig. 1, looking in the direction of the arrow.

A is the collar; B, one part of the fastener; $b$, a hook or tongue formed thereon; C, the other part of the fastener; $c$, a box or socket thereon; D, a rotating hook or catch in such box operated by means of the key $d$; E, a ring attached to such key; F F, screws or bolts for attaching the fastener to the collar, and G G plates or nuts engaging with such screws.

The horse-collar to which this fastener is applied may be made in any of the well-known forms of separable horse collars, and requires no further description.

The fastener is made in two parts B and C, preferably bent or curved, as shown in Fig. 3, to correspond to the shape of the collar. These parts are preferably flat on their outer surface, so as to lie practically flush against the surface of the collar and offer no obstacle to the hame-strap. They are preferably made with a recess $c'$ on the inner side, as shown in Figs. 4 and 5, for the purpose hereinafter set forth.

To attach each part of the fastener to the collar, I preferably employ two or more screws or bolts F, passing through the fastener and the collar and held in place by means of a plate or double nut G. This plate is preferably made with a rounded inner surface, as shown in Figs. 3 and 5, whereby as the screws are tightened the plate will be forced against the inner side of the collar and press the collar into the recess formed in the fastener, as shown in Fig. 5, making a tight and even joint. The plates G are flattened on their outer surface, as shown in Fig. 5, and the screws are cut off flush, thus affording a perfectly-smooth surface and avoiding any chafing or galling of the horse's neck.

The part B of the fastener is provided with a hook or tongue $b$, as shown in the drawings, and the part C with a box or recess $c$, adapted to receive this hook. In this box or recess is mounted a rotating hook D, which is turned by means of a key or handle $d$. This key is adapted to receive the hame-strap, and to the lower side of this key I prefer to attach a ring E for the collar-strap.

To fasten the parts of the collar together, the key $d$ is turned into a substantially horizontal position, whereby the hook D is raised in the position shown by dotted lines in Fig. 4. The parts of the collar are then brought together and the hook $b$ inserted in the box $c$. The hook D is then rotated into a horizontal position, engaging with the hook $b$, as shown in Fig. 4, the key then standing in a substantially vertical position. It will of course be understood that the hook $b$ is bent in one direction and the hook D in the other, so as to enable them to interlock. The hame-strap being passed through the key $d$ serves to prevent the key from turning.

To separate the collar, the hame-strap is first removed and the hook D turned into a substantially vertical position, releasing the hook $b$ and allowing the collar to be separated, the key then standing in a substantially horizontal position—

I claim—

1. A fastener for separable horse-collars, consisting of two parts B and C, the part B having a hook $b$ and the part C having a box to receive such hook, and a rotating hook mounted in such box and engaging with the hook $b$ when in a substantially horizontal position, substantially as described.

2. A fastener for separable horse-collars, consisting of the interlocking parts B and C, having recesses $c'$ in their inner surfaces, screws F, and rounded plates G, whereby when the fastener is attached to the collar the latter is forced by the plates into the recesses $c'$, substantially as described.

3. A fastener for separable horse-collars, consisting of the curving part B, having a hook $b$, curving part C, having a box $c$, and a rotating hook D, adapted to interlock with the hook $b$ when in a substantially horizontal position, the handle $d$ of the rotating hook being provided with a loop to receive the hame-strap, and a ring E to receive the collar-strap, substantially as described.

4. In a fastener for separable horse-collars, the combination of the curving recessed parts B and C, interlocking, as shown, one part being provided with a turning handle or key $d$, adapted to receive the hame-strap and a ring E, screws F, and rounded plates G, substantially as described.

CARL G. ORTMAYER.

Witnesses:
CHAS. F. G. STENCLES,
GEORGE S. PAYSON.